(12) United States Patent
Jung et al.

(10) Patent No.: US 11,053,904 B2
(45) Date of Patent: Jul. 6, 2021

(54) FUEL INJECTOR

(71) Applicant: Robert Bosch GmbH, Stuttgart (DE)

(72) Inventors: Klaus Jung, Waiblingen (DE); Nelly Krause, Hemmingen (DE); Tobias Keller, Gueglingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/633,648

(22) PCT Filed: Jun. 11, 2018

(86) PCT No.: PCT/EP2018/065316
§ 371 (c)(1),
(2) Date: Jan. 24, 2020

(87) PCT Pub. No.: WO2019/025059
PCT Pub. Date: Feb. 7, 2019

(65) Prior Publication Data
US 2020/0166012 A1  May 28, 2020

(30) Foreign Application Priority Data

Jul. 31, 2017 (DE) .......................... 102017213167.5

(51) Int. Cl.
*F02M 1/00* (2006.01)
*F02M 61/14* (2006.01)
(Continued)

(52) U.S. Cl.
CPC .......... *F02M 61/14* (2013.01); *F02M 55/004* (2013.01); *F02M 55/02* (2013.01);
(Continued)

(58) Field of Classification Search
CPC ... F01L 7/16; F01L 7/18; F02M 47/00; F02M 51/06; F02M 61/18
(Continued)

(56) References Cited

U.S. PATENT DOCUMENTS

| | | | |
|---|---|---|---|
| 5,730,100 A * | 3/1998 | Bergsten | F02M 57/06 123/297 |
| 2006/0027685 A1* | 2/2006 | Reiter | F02M 61/165 239/585.1 |
| 2016/0326999 A1 | 11/2016 | Kim | |

FOREIGN PATENT DOCUMENTS

| | | |
|---|---|---|
| DE | 10359299 A1 | 8/2005 |
| JP | S59211758 A | 11/1984 |

(Continued)

OTHER PUBLICATIONS

International Search Report for PCT/EP2018/065316, dated Sep. 17, 2018.

*Primary Examiner* — John Kwon
(74) *Attorney, Agent, or Firm* — Norton Rose Fulbright US LLP; Gerard Messina

(57) ABSTRACT

A fuel injector is described which is able to be preassembled in a receiving opening of a fuel-distributor line in a loss-proof manner in a structural unit in the form of a fuel charge assembly for transport to the final assembly at the vehicle manufacturer. A radial support disk for preventing the loss of the fuel injector is disposed on the inflow-side end of the inlet pipe by press-fitting the radial support disk in the receiving opening. The fuel injector is particularly suitable for the direct injection of fuel into a combustion chamber of a mixture-compressing internal combustion engine having externally supplied ignition.

16 Claims, 5 Drawing Sheets

(51) Int. Cl.
  *F02M 55/00* (2006.01)
  *F02M 55/02* (2006.01)
  *F02M 61/16* (2006.01)
  *F02M 61/18* (2006.01)

(52) U.S. Cl.
  CPC .......... *F02M 61/166* (2013.01); *F02M 61/18* (2013.01); *F02M 2200/856* (2013.01)

(58) Field of Classification Search
  USPC ......... 123/188.1, 190.17, 470; 277/387, 392, 277/399, 407
  See application file for complete search history.

(56) References Cited

FOREIGN PATENT DOCUMENTS

| | | | | |
|---|---|---|---|---|
| JP | 2005291136 A | * | 10/2005 | ........... F02M 61/165 |
| JP | 2007032474 A | | 2/2007 | |
| JP | 2007057006 A | | 3/2007 | |
| JP | 2010180759 A | | 8/2010 | |
| WO | 2013183357 A1 | | 12/2013 | |

* cited by examiner

250  RELATED ART

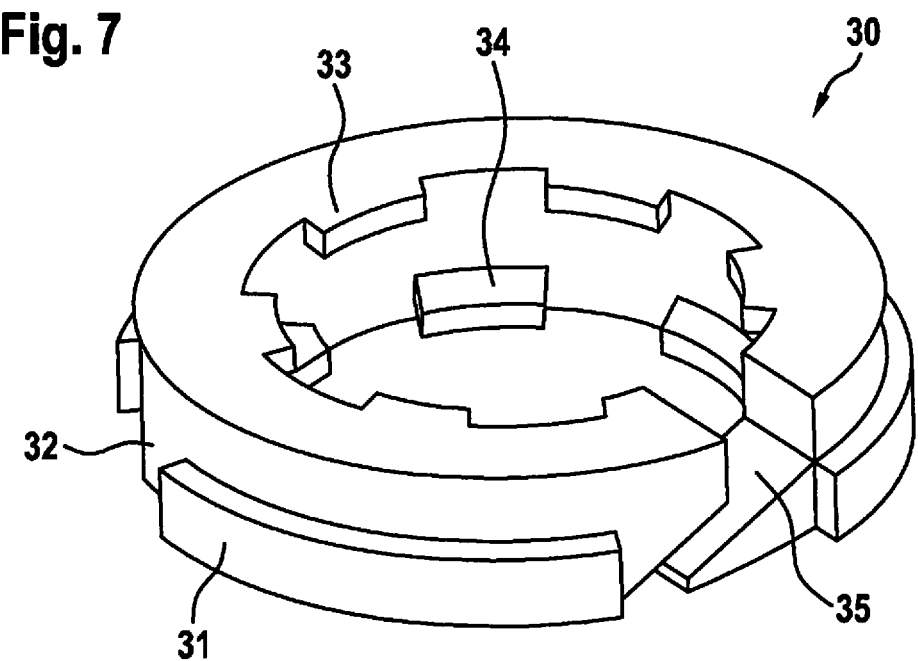
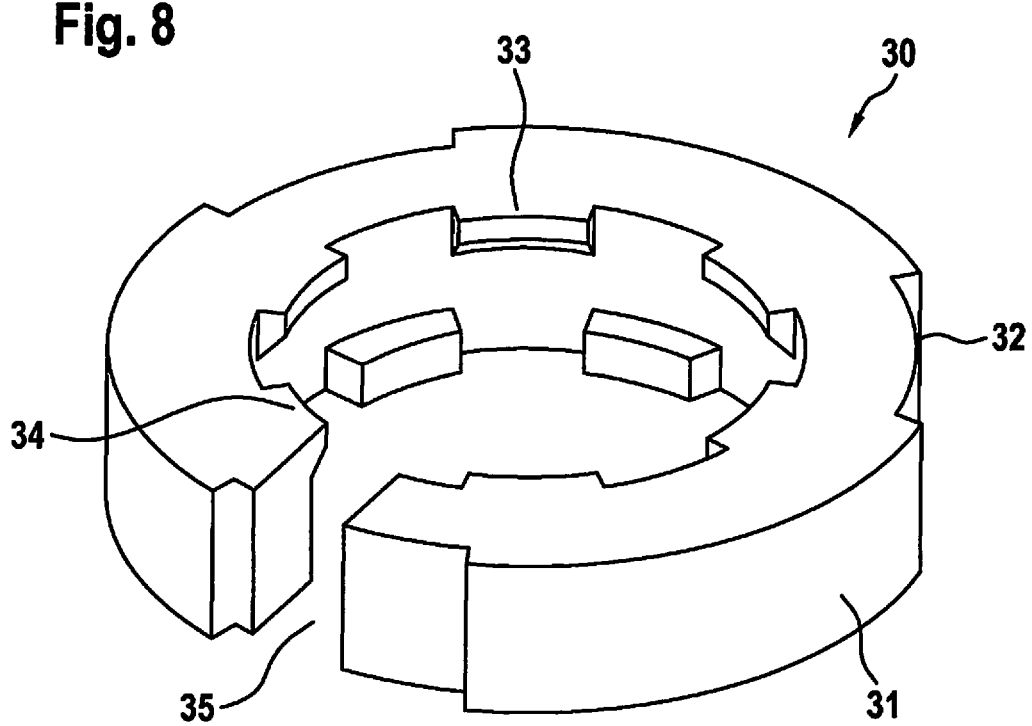

FUEL INJECTOR

FIELD

The present invention relates to a fuel injector.

BACKGROUND INFORMATION

FIG. 1 exemplarily shows a fuel-injection device from the related art, whose inlet pipe is sealed from the receiving cup of a fuel distributor line by a conventional sealing ring made of elastomeric material. The fuel-injection device is particularly suitable for use in fuel-injection systems of mixture-compressing internal combustion engines having externally supplied ignition. Numerous fuel injectors of this type are available and German Patent No. DE 103 59 299 A1 describes one example.

SUMMARY

The fuel injector according to the present invention may have the advantage that the inlet pipe of the fuel injector is able to be preassembled in a loss-proof manner in the receiving opening of a connection fitting of a fuel distributor line by press-fitting a radial support disk disposed on an inlet pipe.

To allow fuel injectors to be installed in the receiving bores of the cylinder head, they usually have to be supplied to the engine or vehicle manufacturer for assembly. This supply is advantageously realized in the form of a compact structural unit, also known as a fuel charge assembly, which is made up of the fuel distributor line and the fuel injectors that are already preassembled in the receiving openings. It is now advantageously ensured that the fuel injectors, after their preassembly on the fuel distributor line when the fuel injector is not yet in its final position, remain in place there without the risk of loss until the installation on the cylinder head.

It is particularly advantageous that the radial support disk not only has the loss-prevention function in the preassembled state but also ensures that disadvantageous tilting or oscillating of the fuel injector during the entire transport of the fuel charge assembly until the final assembly is effectively prevented.

The measures described herein allow for advantageous further developments and improvements of the fuel injector in accordance with the present invention.

In an advantageous manner, the radial support disk is disposed on an end collar of the inlet pipe already upstream from the sealing ring installed on the inlet pipe when viewed in the flow direction. In this way, the radial support disk is able to be attached to the inlet pipe of the fuel injector in a very easy and cost-effective manner. Slippage of the radial support disk on the inlet pipe of the fuel injector in the axial direction is ruled out by multiple tabs on the radial support disk, which are distributed across the circumference and project radially inward from a base body ring, the tabs clasping the end collar from above and below. As long as the fuel injector has not yet been installed in the receiving opening of the connection fitting, the radial support disk is still rotatable in the circumferential direction on the end collar of the inlet pipe.

It is particularly advantageous if the outer circumference of the radial support disk is provided with press-fitting regions that project radially farther outward in alternation with press-fitting regions that are radially recessed and, due to their larger outer diameter than the inner diameter of the receiving opening, only the press-fitting regions are involved in the press-fitting with the connection fitting.

Ideally, the radial support disk has a slot which extends across the entire component height in the axial direction, the slot making it possible to install the radial support disk on the fuel injector in an especially easy manner and to compensate for tolerances on account of its deformability.

The radial support disk is developed as a thin, compact disk, which is made from plastic such as PEEK, PPS, POM, or from a metal such as aluminum.

The radial support disks according to the present invention are particularly suitable for preventing the loss of fuel injectors having inlet pipes that are provided with a conically extending section.

BRIEF DESCRIPTION OF THE DRAWINGS

Exemplary embodiments of the present invention are shown in simplified form in the figures and described in greater detail below.

FIG. 7 shows a first development of a radial support disk according to the present invention in a perspective view.

FIG. 8 shows a second development of a radial support disk according to the present invention in a perspective view.

DETAILED DESCRIPTION OF EXAMPLE EMBODIMENTS

Figure 1:
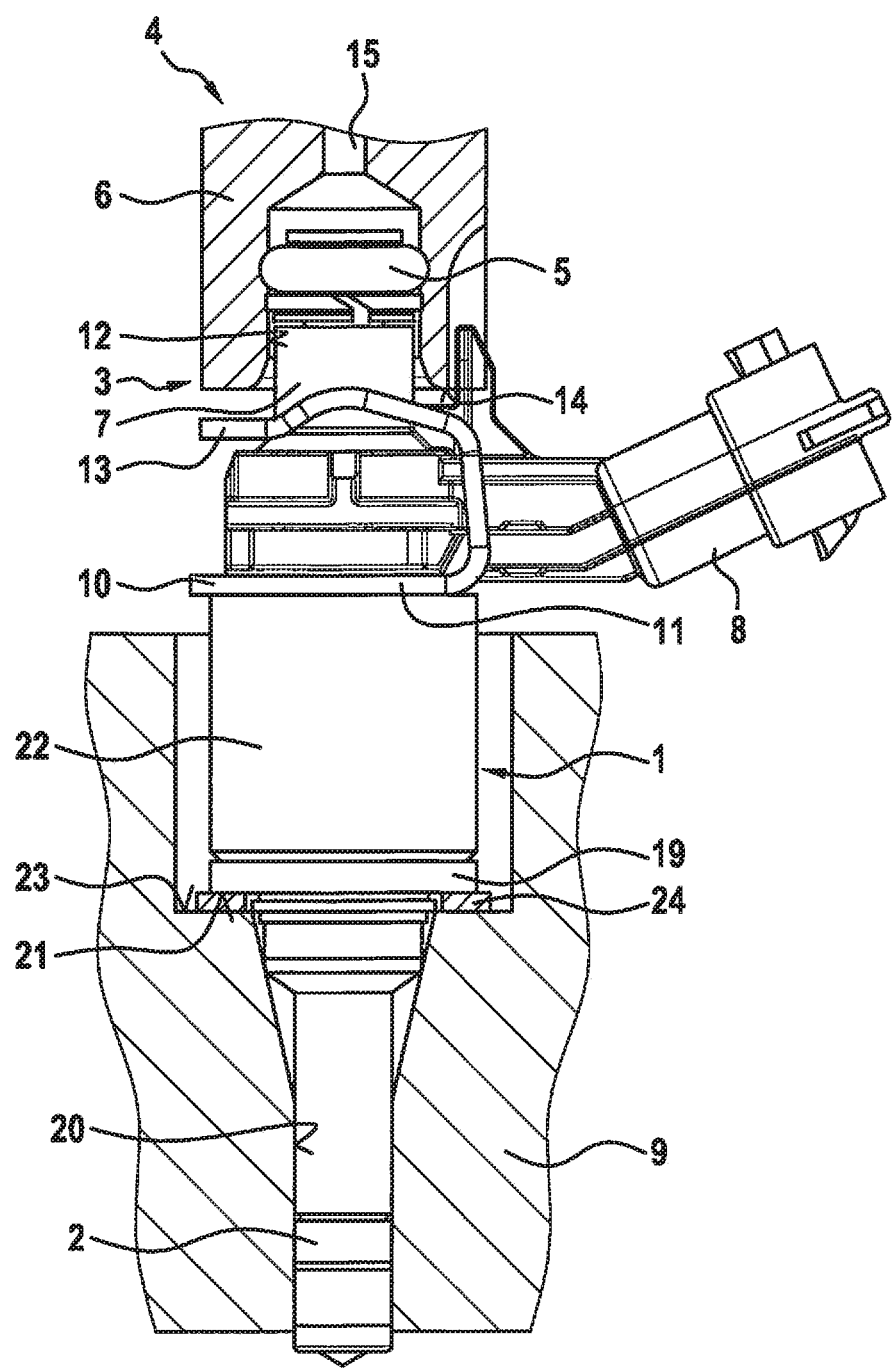
FIG. 1 shows a partially illustrated fuel-injection device in a conventional configuration.

For a better understanding of the present invention, a conventional fuel-injection device is described in greater detail below on the basis of FIG. 1. FIG. 1 shows as an exemplary embodiment a valve in the form of a fuel injector 1 for fuel-injection systems of mixture-compressing internal combustion engines having externally supplied ignition, in a side view. Fuel injector 1 is part of the fuel-injection device. Via a downstream end, fuel injector 1, which is developed in the form of a directly injecting fuel injector for the direct injection of fuel into a combustion chamber 250 of the internal combustion engine, is installed in a receiving bore 20 of a cylinder head 9. A sealing ring 2, in particular made of Teflon®, provides for optimum sealing between fuel injector 1 and the wall of receiving bore 20 of cylinder head 9.

An intermediate element 24, which is used as a damping or decoupling element, for example, is inserted between a step 21 of a valve housing 22 (not shown) or a lower end face 21 of a support element 19 (FIG. 1) and a shoulder 23 of receiving bore 20, the shoulder extending at a right angle to the longitudinal extension of receiving bore 20, for example. Such an intermediate element 24 is also used to compensate for production and installation tolerances and to ensure support that is free of transverse forces even if fuel injector 1 is positioned at a slight tilt.

On its inflow-side end 3, fuel injector 1 has a plug connection to a fuel-distributor line (fuel rail) 4, which is sealed by a sealing ring 5 between a connection fitting (rail cup) 6 of fuel-distributor line 4, which is shown in a sectional view, and an inlet pipe 7 of fuel injector 1. Fuel injector 1 is inserted into a receiving opening 12 of connection fitting 6 of fuel-distributor line 4. Connection fitting 6 emerges from actual fuel-distributor line 4 in one piece, for instance, and has a flow opening 15 with a smaller diameter upstream from receiving opening 12, via which the flow approaches fuel injector 1. Fuel injector 1 is provided with an electric connector plug 8 for the electrical contacting for the actuation of fuel injector 1.

Electric connector plug 8 is connected via corresponding electrical lines to an actuator (not shown here) whose excitation makes it possible to achieve a lifting motion of a valve needle, thereby allowing for an actuation of a valve closure body which forms a sealing seat together with a valve-seat surface. These latter components are not explicitly illustrated and may have any already conventional designs. For example, the actuator is able to be operated in an electromagnetic, piezoelectric or magneto-restrictive manner.

To set fuel injector 1 and fuel-distributor line 4 apart from each other free of radial forces for the most part and to reliably retain fuel injector 1 in receiving bore 20 of cylinder head 9, a hold-down device 10 is provided between fuel injector 1 and connection fitting 6. Hold-down device 10 is developed in the form of a clip-shaped component, e.g., as a punched and bent part. Hold-down device 10 has a partially ring-shaped base element 11 from which a hold-down clip 13 extends at an angle, which rests against fuel-distributor line 4 at a downstream end face 14 of connection fitting 6 in the installed state.

To allow for an installation of fuel injectors 1 in receiving bores 20 of cylinder head 9, they usually have to be supplied to the engine or vehicle manufacturer for assembly. In an advantageous manner, this supply takes the form of a compact structural unit, known as a fuel charge assembly, which is made up of fuel-distributor line 4 and fuel injectors 1 already preassembled in receiving openings 12. It has to be ensured here that after the preassembly on fuel-distributor line 4, fuel injectors 1 remain there without getting lost until the installation on cylinder head 9. In the preassembled state, i.e. in the state in which the fuel charge assembly is supplied to the customer for the engine assembly, fuel injector 1 is not yet in the final position in receiving opening 12 but projects farther from receiving opening 12 than in the final assembly position because hold-down device 10 has not been tensioned yet.

An object of the present invention is to ensure that fuel injectors 1 safely and reliably remain in receiving openings 12 of fuel-distributor line 4 during the entire time from the preassembly to the final assembly. Vibrations or accelerations and the application of forces during transport and handling of the fuel charge assembly during the preassembly and the final assembly at the vehicle manufacturer constitute different danger sources for an accidental detachment of fuel injectors 1 from receiving openings 12 of fuel-distributor line 4, which can be completely ruled out according to the present invention.

Figure 2:
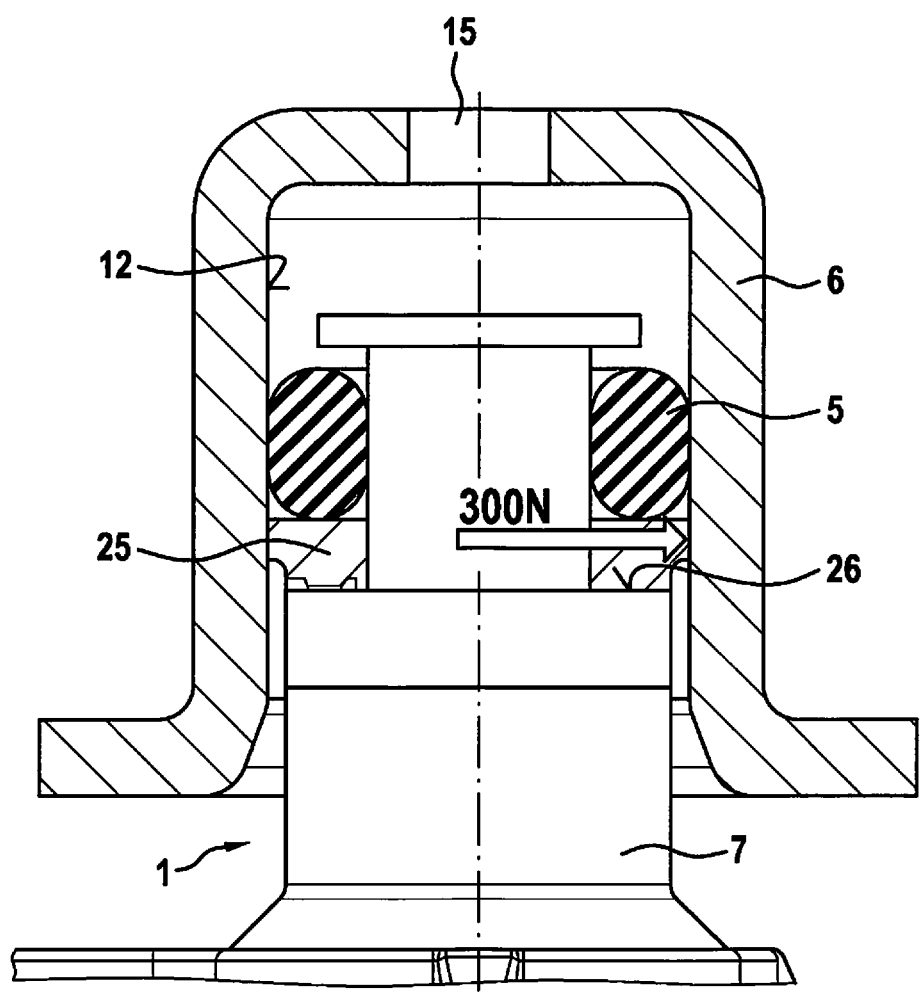
FIG. 2 shows a first hydraulic interface in the region of a receiving opening of the fuel-distributor line.
Figure 3:
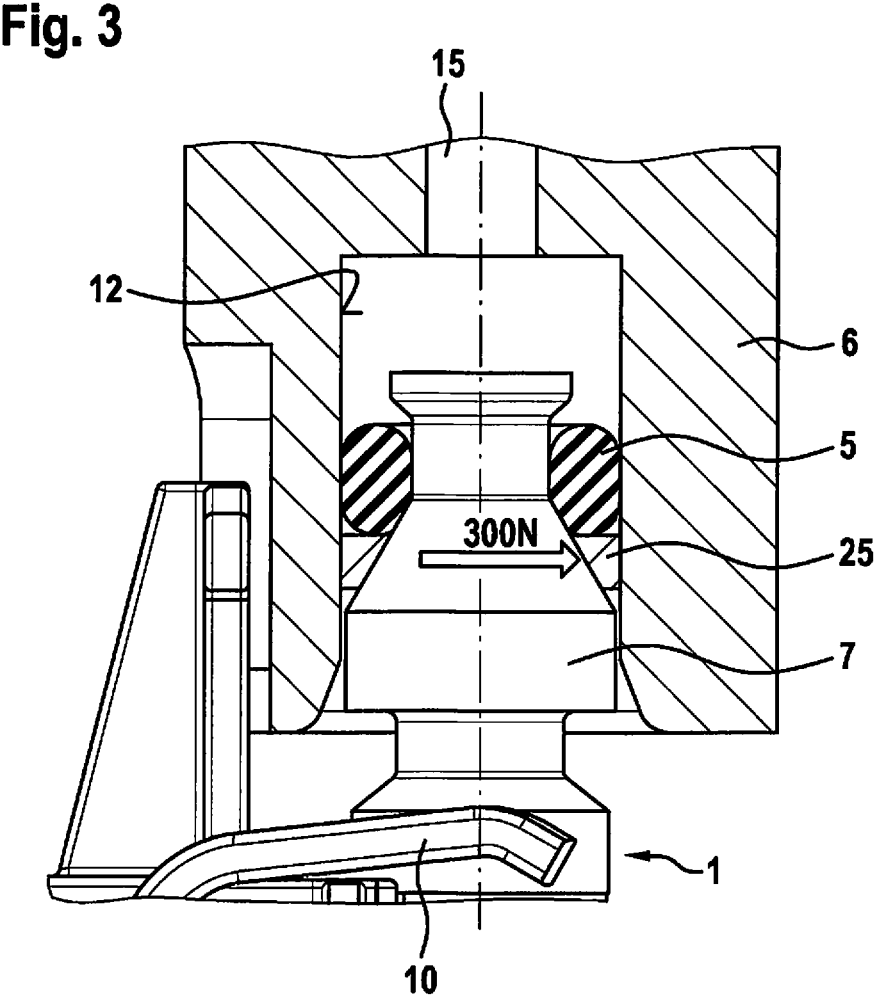
FIG. 3 shows a second hydraulic interface in the region of a receiving opening of the fuel-distributor line.

FIGS. 2 and 3 show hydraulic interfaces in the region of receiving openings 12 of fuel-distributor line 4, the structure shown in FIG. 2 being similar to that of FIG. 1. In this development, inlet pipe 7 of fuel injector 1 has a cylindrical shape. Sealing ring 5 is clamped between the inner wall of receiving opening 12 and inlet pipe 7. In addition, a support ring 25 is provided underneath sealing ring 5, which is supported on a shoulder 26 of inlet pipe 7, for example. Fuel injector 1 is radially supported via support ring 25. Slippage of sealing ring 5 is impossible in this way. For that reason, the press-fitting of sealing ring 5 is also not affected either.

Figure 4:
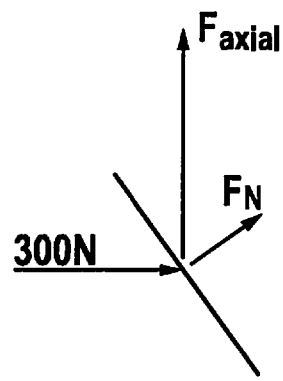
FIG. 4 shows a schematic force distribution of the radial force at the conically extending wall of the inlet pipe according to FIG. 3.

In contrast to the development of the hydraulic interface in the region of receiving opening 12 of fuel-distributor line 4 of FIG. 2, a conically extending section is provided in the case of inlet pipe 7 of fuel injector 1 shown in FIG. 3, which is surrounded by support ring 25 via an also conically extending inner opening and partially by sealing ring 5. Because of a force division of the radial force at the conically extending wall of inlet pipe 7, possibly also into an axial force component (see schematic illustration in FIG. 4), there is the risk of unilateral slipping of sealing ring 5 in the upward direction, away from the conical section, if the axial force of support ring 25 is greater than the displacement force of sealing ring 5. This slippage could be accompanied by a reduced compression of sealing ring 5. In the presence of vibrations or the back-and-forth movements of fuel injector 1 during transport, this may happen in alternation on different sides across the circumference of the inner wall of receiving opening 12, which means that there is a risk of fuel injector 1 becoming loose in receiving opening 12.

Figure 5:
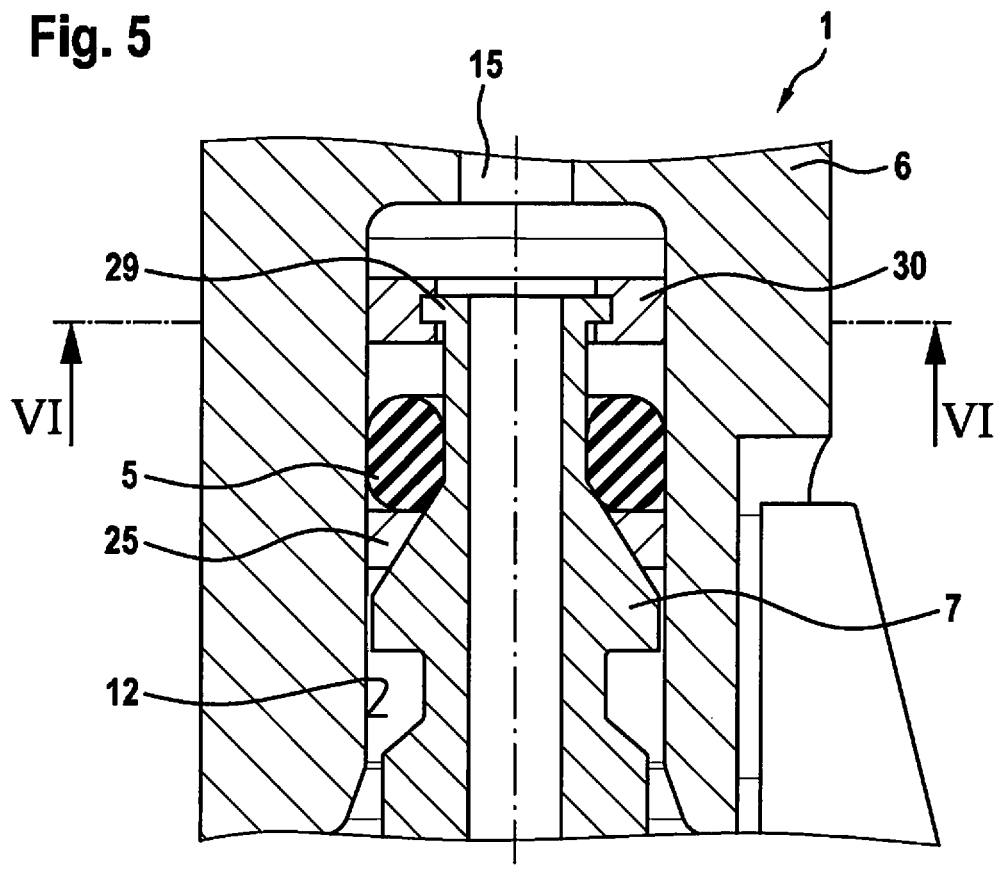
FIG. 5 shows a hydraulic interface in the region of a receiving opening of the fuel-distributor line to a radial support disk according to the present invention.

FIG. 5 shows a partially illustrated fuel-injection device having a first fuel injector 1 according to the present invention. In this embodiment of fuel injector 1, it has on its inflow-side end 3 in the region of an end collar 29 a radial support disk 30 according to the present invention, which serves as a loss prevention. Radial support disk 30 is developed in the form of a thin but compact disk, which may be made from plastic (e.g., PEEK, PPS, POM) or a metal (e.g., aluminum). Radial support disk 30 is axially mounted from above on fuel injector 1 such as with the aid of a locating pin. Alternatively, radial support disk 30 is able to be mounted using a spread gripper or a similar tool. In that regard, radial support disk 30 is disposed still upstream from sealing ring 5 when viewed in the flow direction.

Figure 6:
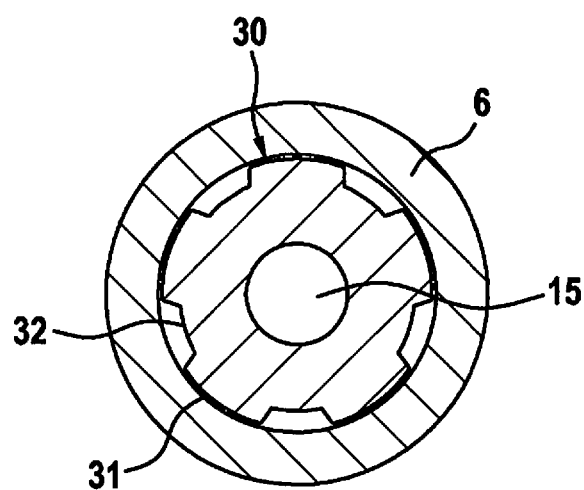
FIG. 6 shows a simplified sectional view through the radial support disk along line VI-VI in FIG. 5.

FIG. 6 shows a simplified sectional view through radial support disk 30 along line VI-VI in FIG. 5. This representation is mainly meant to illustrate that radial support disk 30 is provided at its outer circumference with alternating press-fitting regions 31 that project farther outward and radially recessed regions 32.

A first embodiment of a radial support disk 30 according to the present invention is shown in a perspective view in FIG. 7. Radial support disk 30 has a planar upper and lower side. The geometry of radial support disk 30 is characterized in that multiple tabs 33, 34 are formed across the circumference, which project radially inward from a base body ring. Multiple tabs 33 are formed starting from the upper side of radial support disk 30, while additional tabs 34 are provided starting from the lower side of radial support disk 30, which project radially farther inward. As shown in FIG. 7, tabs 33 and 34 may be developed at an offset from one another viewed across the circumference. Tabs 33, 34 have inner limiting surfaces, which extend either at a right angle, i.e., in an axially parallel manner, or in an oblique manner or, ideally, as may be gathered from FIG. 7, feature a bevel that extends out of a perpendicular limiting surface. Tabs 33, 34 ensure that radial support disk 30 safely and reliably remains on inlet pipe 7 because of the created undercut on the existing geometry of end collar 29 of inlet pipe 7. Tabs 33 on the upper side have to be able to absorb the corresponding assembly forces. In addition, tabs 33 on the upper side must also be able to absorb hydraulic forces during the operation and during the initial filling of the system. Tabs 34 on the lower side have to be able to withstand the corresponding disassembly forces (after ageing across the service life inside the respective fuel).

In the embodiment shown in FIG. 7, radial support disk 30 has been provided with a slot 35, which extends at a right angle in a first axial subsection and extends at an angle in a second axial subsection. This embodiment variant is particularly advantageous because radial support disks 30 are able to be handled as bulk material without getting entangled with one another. However, slot 35 may also have an oblique extension throughout. It is even possible to omit slot 35 altogether if the material of radial support disk 30 has sufficient elasticity. As a rule, a slot 35 in radial support disk 30 will be required for assembly-related reasons. Slot 35 makes it much easier to install radial support disk 30 on end collar 29 of inlet pipe 7 because the material of radial support disk 30 is subjected to considerably lower strain loads in comparison to an unslotted variant.

In its press-fitting regions 31 that project radially farthest outward, radial support disk 30 has a larger outer diameter than the inner diameter of receiving opening 12 of fuel-distributor line 4. As a consequence, radial support disk 30 is inserted under pressure during the preassembly of fuel injector 1 in receiving opening 12, the assembly being made easier by slot 35, and a tolerance compensation being possible. In the illustrated exemplary embodiment, press-fitting regions 31 extend only across a portion of the component height, i.e., only across the lower half of the component height in this instance. The radially recessed regions 32 form through-flow pockets, which are meant to prevent radial support disk 30 from being bent down by end collar 29 of inlet pipe 7 during the initial filling with fuel and from exerting pressure on sealing ring 5.

A second embodiment of a radial support disk 30 according to the present invention is shown in a perspective view in FIG. 8. This radial support disk 30 differs from radial support disk 30 according to FIG. 7 in that a perpendicularly extending slot 35 is provided, the press-fitting regions 31 extend across the entire component height, and slot 35 is eccentrically situated in one of the three radially recessed regions 32.

The individual geometrical features illustrated on radial support disks 30 of FIGS. 7 and 8 may also always be combined with one another.

What is claimed is:

1. A fuel injector for a fuel-injection system of internal combustion engine, comprising:
   a valve needle;
   a valve-closure body;
   a valve-seat surface;
   an actuator whose excitation is configured to provide a lifting motion of the valve needle to allow for an actuation of the valve-closure body which forms a sealing seat together with the valve-seat surface;
   an inflow-side inlet pipe for a supply of fuel; and
   a radial support disk for preventing a loss of the fuel injector in an installed state, the radial support disk being situated on an inflow-side end of the inlet pipe;
   wherein the radial support disk is at an outer circumference of the radial support disk with alternating press-fitting regions that project outward and radially recessed regions,
   wherein the press-fitting regions of the radial support disk extend either across a portion of a height of the radial support disk or across the entire height of the radial support disk, and
   wherein the radial support disk is interrupted by a slot which extends across the radial support disk in an axial direction.

2. The fuel injector as recited in claim 1, wherein the fuel injector is for direct injection of fuel into the combustion chamber of the internal combustion engine.

3. The fuel injector as recited in claim 1, wherein the inlet pipe includes a sealing ring which surrounds the inlet pipe, and wherein the radial support disk is disposed upstream from the sealing ring when viewed in a flow direction.

4. The fuel injector as recited in claim 3, wherein an end collar is on the inflow-side end of the inlet pipe, and the radial support disk at least partially clasps the end collar from above and below the end collar.

5. The fuel injector as recited in claim 4, wherein multiple tabs are formed on the radial support disk distributed across the circumference, which project radially inward from a base body ring.

6. The fuel injector as recited in claim 5, wherein the multiple tabs include tabs formed starting from an upper side of the radial support disk, and additional tabs provided starting from a lower side of the radial support disk, which project radially farther inward than the tabs.

7. The fuel injector as recited in claim 6, wherein the tabs and the additional tabs are at an offset from one another when viewed across the circumference.

8. The fuel injector as recited in claim 1, wherein the radial support disk is a thin, compact disk, which is made from plastic or from a metal.

9. The fuel injector as recited in claim 8, wherein the radial support disk is made from PEEK or PPS or POM.

10. The fuel injector as recited in claim 8, wherein the radial support disk is made from aluminum.

11. The fuel injector as recited in claim 1, wherein the inlet pipe has a conically extending section.

12. A fuel-injection device, comprising:
   a fuel injector for a fuel-injection system of internal combustion engine, the fuel injector including valve needle, a valve-closure body, a valve-seat surface, an actuator whose excitation is configured to provide a lifting motion of the valve needle to allow for an actuation of the valve-closure body which forms a sealing seat together with the valve-seat surface, an inflow-side inlet pipe for a supply of fuel, and a radial support disk for preventing the loss of the fuel injector in an installed state, the radial support disk being situated on an inflow-side end of the inlet pipe, wherein the radial support disk is at an outer circumference of the radial support disk with alternating press-fitting regions that project outward and radially recessed regions, wherein the press-fitting regions of the radial support disk extend either across a portion of a height of the radial support disk or across the entire height of the radial support disk, and wherein the radial support disk is interrupted by a slot which extends across the radial support disk in an axial direction; and
   a fuel-distributor line having at least one connection fitting having a receiving opening for the fuel injector, the inlet pipe of the fuel injector being preassembled in a loss-proof manner by press-fitting the radial support disk in the receiving opening.

13. The fuel injection device as recited in claim 12, wherein the fuel injector includes an intermediate element, which is used as a damping element and/or a decoupling element, and which is inserted between a step of a valve housing or a lower end face of a support element and a shoulder of a receiving bore, the shoulder extending at a right angle to a longitudinal extension of the receiving bore.

14. The fuel injection device as recited in claim 12, wherein in the radial support disk, the slot extends perpendicularly, and wherein the press-fitting regions extend across the entire component height, and the slot is eccentrically situated in one of three radially recessed regions.

15. The fuel injector as recited in claim 1, further comprising:
   an intermediate element, which is used as a damping element and/or a decoupling element, and which is inserted between a step of a valve housing or a lower end face of a support element and a shoulder of a receiving bore, the shoulder extending at a right angle to a longitudinal extension of the receiving bore.

16. The fuel injector as recited in claim 1, wherein in the radial support disk, the slot extends perpendicularly, and wherein the press-fitting regions extend across the entire component height, and the slot is eccentrically situated in one of three radially recessed regions.

\* \* \* \* \*